June 29, 1926.
W. J. SEMELROTH
LANTERN SLIDE CARRIER
Filed Dec. 19, 1924
1,590,704
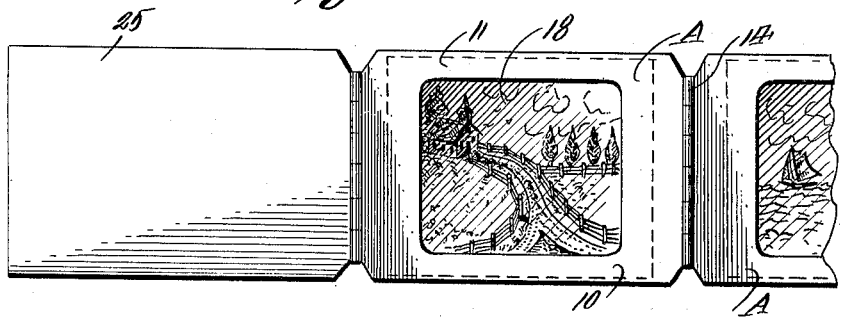
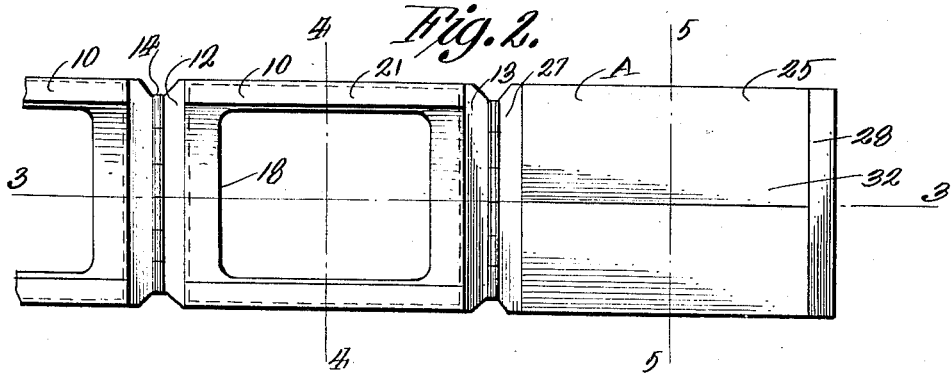
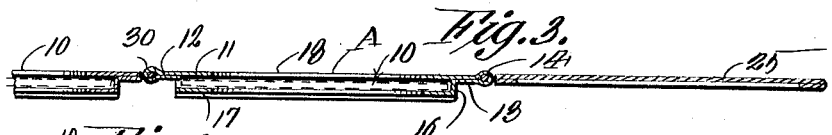
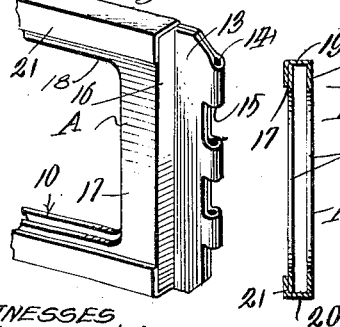
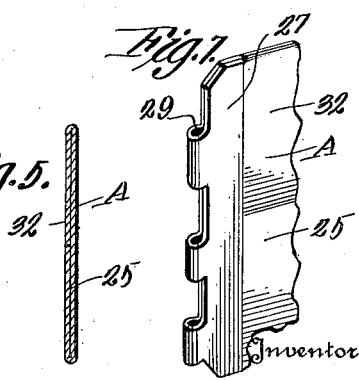
WITNESSES
INVENTOR
WILLIAM J. SEMELROTH
By Richard B. Owen
Attorney Patented June 29, 1926.

1,590,704

UNITED STATES PATENT OFFICE.

WILLIAM J. SEMELROTH, OF WESTFIELD, WISCONSIN.

LANTERN-SLIDE CARRIER.

Application filed December 19, 1924. Serial No. 756,985.

This invention appertains to a novel device for supporting glass or other transparent lantern slides to facilitate the handling and transporting thereof and the feeding of the slides in proper sequence through a stereopticon machine.

The primary object of the invention is the provision of a novel slide carrier embodying a plurality of independent sections for receiving the slide and novel means for detachably and pivotally connecting the sections together, for permitting different sections to be associated together and for permitting the sections to be folded one upon the other when the slides are not in use, or being stored or shipped.

Another object of the invention is the provision of a novel slide carrier for receiving lantern slides, the sections of the carrier permitting the convenient handling of the slides without the direct fingering thereof, the sections being hingedly connected together to permit the slides to be folded one upon the other, the end sections having suitable cover plates hingedly connected thereto for protecting the slides against dust and breakage.

A further object of the invention is to provide novel means for forming the sections of the carrier from a single strip of sheet material, such a sheet metal, cardboard and the like.

A still further object of the invention is to provide a novel slide carrier of the above character which will be durable and efficient in use, one that will be simple and easy to manufacture and one which can be readily placed upon the market at a small cost.

With these and other objects in view, the invention consists in the novel construction arrangement and formation of parts, as will be hereinafter more specifically described, claimed and illustrated in the accompanying drawings, in which drawings, Figure 1 is a fragmentary elevation of the improved slide carrier showing one face thereof, Figure 2 is a similar view showing the opposite face thereof, Figure 3 is a fragmentary longitudinal section through the improved carrier taken on the line 3—3 of Figure 2, Figure 4 is a detail transverse section taken through one of the slide receiving sections on the line 4—4 of Figure 2, Figure 5 is a detail transverse section taken on the line 5—5 of Figure 2 through one of the cover sections, Figure 6 is a detail perspective view showing one end of one of the slide receiving sections, Figure 7 is a fragmentary detail perspective view showing one end of one of the cover sections.

Referring to the drawings in detail, wherein similar reference characters designate corresponding parts throughout the several views the letter A generally indicates the improved slide carrier, which comprises a plurality of slide receiving sections 10 and end cover sections 25.

Each of the slide receiving sections 10 embody a rear wall 11 having its opposite ends folded back upon itself as at 12 and 13 and rolled to provide hinge barrels 14. These hinge barrels are notched at spaced points as at 15 to permit the interconnection of one hinge barrel 14 of one section with the hinge barrel 14 of another section. The bent back portion 13 is bent outwardly at right angles to the wall 11 to provide an end wall 16 and is then bent forwardly in spaced parallel relation to the rear wall 11 to provide a front wall 17. These walls 11 and 17 are provided with aligned sight openings 18 through which the picture on the slide associated with the section is adapted to be seen. The upper and lower edges of the rear wall 11 are provided with laterally projecting flanges which form top and bottom walls 19 and 20 for the slide and these walls have flanges 21 formed thereon for engaging the wall 17. By this construction it can be seen that a slide receiving section has been formed from a single sheet of material which will effectively encase the slide and permit the convenient handling thereof.

In the form shown in the drawing the carrier is particularly adapted to be formed from flexible material, such as card board, reenforced fabric or the like in order to permit the sections to give a limited extent during the folding of the sections one upon the other. When the sections are to be formed from rigid material such as tin the hinge barrels 14 are offset from the side wall 11 so as to lie intermediate the walls 17 and 11.

The end cover plates 25 are also formed from sheet material and are of substantially the same size as the slide receiving sections 10 and in order to insure the rigidity of the cover sections the terminals thereof are bent back upon the main portion of the cover as at 27 and 28. The bent back portion 27 is rolled to provide a hinge barrel 29 which is also notched so as to permit the interfitting thereof with the hinge barrels 14. It is to be understood that the aligned hinged barrels of the various sections are connected together by suitable pivot pins 30 which can be removed when so desired. The main body of the cover sections is further braced if so desired and the longitudinal edges of the body of the cover plate can be provided with extensions 32 which can be bent back into engagement with one face of the plate as clearly shown in Figure 5 of the drawing.

In use of the improved device any number of the slide receiving sections 10 are connected together and the slides are placed in the sections in proper sequence through the open end thereof. When the slides are to be exhibited, the entire device A can be readily slid through the stereopticon machine and it is obvious that the slides will be shown at the proper time. The carrier can be so constructed as to permit the slides to be slid through the machine either in a horizontal or a vertical plane. As the carrier comes from the machine the sections thereof are folded one upon the other and when all of the slides have been shown, the folded carrier can be readily placed directly in a travelling bag or other receptacle provided for that purpose.

The use of the improved carrier entirely eliminates the necessity of providing wooden frames for carrying the slides and insures the proper showing of the slides.

Changes as to details may be made without departing from the spirit or the scope of this invention, but:

What I claim as new is:

1. In a slide carrier, a slide receiving section formed from a single sheet of material including a rear wall having its terminals bent back upon itself to provide hinge barrels, said barrels being notched to permit the interconnection of different sections together, one of said bent back terminals being bent outwardly to provide an end wall and forwardly in spaced parallel relation to the rear wall, said rear wall and last mentioned wall being provided with aligned sight openings, and top and bottom walls formed on the rear wall engaging the last mentioned wall.

2. In a slide carrier a plurality of independent intermediate slide receiving sections and end slide receiving sections, each section formed from a single sheet of material and including an inner rear wall, having the terminals thereof bent back upon itself and rolled to define hinge barrels, one of said bent back terminals being provided with a laterally extending flange defining an end wall and a forwardly extending extension defining an outer wall, the inner and outer walls being disposed in spaced parallel relation and provided with aligned sight openings, upper and lower walls carried by the inner wall engaging the outer wall, and imperforated cover plates carried by the end sections.

In testimony whereof I affix my signature.

WILLIAM J. SEMELROTH.